United States Patent [19]

Murphy et al.

[11] 3,922,268
[45] Nov. 25, 1975

[54] 3-HALOMETHYL-Δ³-CEPHALOSPORIN ESTERS

[75] Inventors: Charles F. Murphy; J. Alan Webber, both of Indianapolis, Ind.

[73] Assignee: Eli Lilly and Company, Indianapolis, Ind.

[22] Filed: Aug. 10, 1970

[21] Appl. No.: 62,699

Related U.S. Application Data

[63] Continuation-in-part of Ser. No. 883,231, Dec. 8, 1969, abandoned, which is a continuation-in-part of Ser. No. 811,640, March 28, 1969, abandoned.

[52] U.S. Cl............ 260/243 C; 260/239.1; 424/246
[51] Int. Cl.²........................................ C07D 501/20
[58] Field of Search ................................. 260/243 C

[56] References Cited
UNITED STATES PATENTS

| | | | |
|---|---|---|---|
| 3,597,421 | 8/1971 | Webber............................ | 260/243 C |
| 3,647,786 | 3/1972 | Cooper............................ | 260/243 C |
| 3,658,799 | 4/1972 | Eardley et al.................... | 260/243 C |
| 3,716,533 | 2/1973 | Humber........................... | 260/243 C |

*Primary Examiner*—Nicholas S. Rizzo
*Attorney, Agent, or Firm*—William C. Martens, Jr.; Everet F. Smith

[57] ABSTRACT

3-Halomethyl-Δ³-cephalosporin (sulfide) esters and sulfoxides thereof, prepared by reacting a phosphorus halide with a 3-hydroxymethyl-Δ³-cephalosporin sulfoxide ester, which sulfide esters can be de-esterified to form antibiotics, and which sulfide ester and sulfoxide ester products are useful as intermediates in the production of known and new antibiotics.

6 Claims, No Drawings

3-HALOMETHYL-Δ³ CEPHALOSPORIN ESTERS

CROSS-REFERENCE

This application is a continuation-in-part of our application Ser. No. 883,231, filed Dec. 8, 1969, which is a continuation-in-part of our prior copending application, Ser. No. 811,640, filed Mar. 28, 1969, both now abandoned.

INTRODUCTION

This invention relates to 3-halomethyl-Δ³-cephalosporin esters wherein the sulfur atom in the 1-position of the dihydro-thiazine ring moiety of the cephalosporin can be in the bivalent sulfide (—S—) state or in the sulfoxide [—S(O)—]state, and to a process for preparing such compounds by reacting a phosphorus halide with a 3-hydroxymethyl-Δ³-cephalosporin sulfoxide ester.

BACKGROUND OF THE INVENTION

Cephalosporin C, obtained by fermentation, has been defined as having the following structure

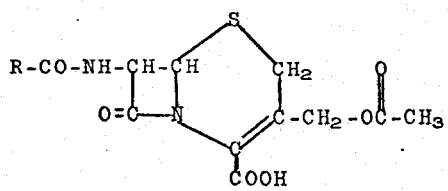

where R is HOOC—CH(NH₂)—(CH₂)₃—. It is also known as 7-(5′-aminoadipamido)cephalosporanic acid. It has weak antibiotic activity, but it is important as a source of the cephalosporin C nucleus, i.e., 7-aminocephalosporanic acid (7-ACA)

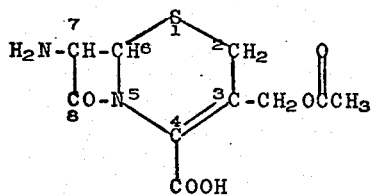

from which nucleus important commercial cephalosporin antibiotics such as cephalothin and cephaloridine are prepared by methods now known. Various derivatives of 7-ACA based antibiotics are made by acylating the 7-amino group of 7-ACA with appropriate acyl groups and/or by replacing the acetoxy group attached to the 3-methyl carbon atom with appropriate nucleophilic groups now well documented in the literature.

In continued research desacetoxycephalosporin compounds, i.e., compounds of the structure

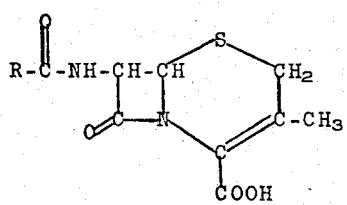

where R is the residue of the acyl group having been prepared. An important known antibiotically active compound in this class is cephalexin, an orally active cephalosporin antibiotic. Morin and Jackson (U.S. Pat. No. 3,275,626) discovered a process for preparing the desacetoxycephalosporanic acid derivatives by rearranging a penicillin sulfoxide ester to the corresponding desacetoxycephalosporin ester, and then removing the ester group. Desacetoxycephalosporanic acid derivative antibiotics are thus obtainable from a penicillin starting material. These compounds are sometimes, for convenience, referred to as being derivatives of 7-aminodesacetoxycephalosporanic acid (7-ADCA) having the structure

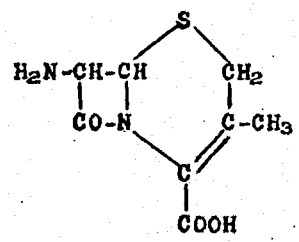

and which is sometimes written in the zwitterionic (inner salt) form.

One of the unique advantages of Δ³-desacetoxycephalosporin compounds, that is, compounds of the general formula

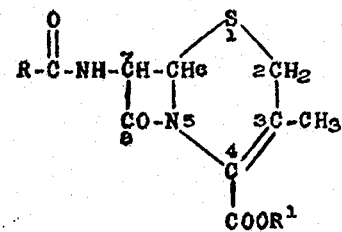

wherein R is the residue of the acylamido group in the 7-position and R¹ is hydrogen, a salt forming cation, an ester group or an anionic charge when the COO— forms a salt with a cation either within or outside of the molecule, is that such compounds can now be prepared from penicillin sulfoxide esters by the Morin-Jackson process.

In efforts to improve and expand the properties of these penicillin derived semi-synthetic cephalosporin substances, efforts have been expended on changing the 3-methyl group of the above Δ³-desacetoxycephalosporins to a group which gives the resulting cephalosporin compound enhanced antibiotic activity against one or more Gram-positive or Gram-negative microorganisms. However, to date at least, it has not been possible to convert directly a Δ³-desacetoxycephalosporin to a 3-(substituted-methyl)-Δ³-cephalosporin in any significant yield. A suggestion in Belgian Pat. No. 684,288 that the 3-methyl group of a Δ³-desacetoxycephalosporanic acid ester could be brominated with N-bromosuccinimide (NBS) to give the corresponding 3-bromomethyl-Δ³-cephalosporin ester has not been accomplished to our knowledge. Webber and Van Heyningen (U.S. patent application Ser. No. 703,523, filed Feb. 7, 1968) now abandoned but replaced by application Ser. No. 790,886, filed Jan. 13, 1969, now U.S. Pat. No. 3,637,678, issued Jan. 1971; and in part by U.S. application Ser. No. 790,842, filed Jan. 13, 1969, now abandoned, but replaced by application Ser. No. 64,614, filed Aug. 17, 1970, now U.S. Pat. No. 3,766,177 have recently discovered a method of functionalizing the 3-methyl group of a desacetoxycephalosporin. That process involves isomerizing the $\Delta^3$ double bond to the $\Delta^2$ position, treating the resulting $\Delta^2$-desacetoxycephalosporin compound with a brominating agent such as N-bromosuccinimide (NBS) to form the corresponding $\Delta^2$-3-bromomethyl compound, and, if desired, replacing the bromine with an appropriate nucleophilic group. Thereafter, the 3-(nucleophile-methyl) -$\Delta^2$-cephalosporin compound can be isomerized to the $\Delta^3$ position by oxidizing the sulfur atom thereof with an inorganic peracid having a reduction potential of at least +1.5 volts and containing only non-metallic elements, organic carboxylic peracids, or with a mixture of hydrogen peroxide or an acid having a dissociation constant of at least $10^{-5}$, as described in more detail in Cooper U.S. application Ser. No. 764,939, filed Oct. 3, 1968, now U.S. Pat. No. 3,647,786, issued Mar. 7, 1972 during which reaction the double bond is moved to the 3-position and then the resulting 3-(nucleophile-methyl)-$\Delta^3$-cephalosporin sulfoxide compound can be reduced as described by Murphy et al. in U.S. application Ser. No. 764,925 filed Oct. 3, 1968 now U.S. Pat. No. 3,641,014, to the sulfide state. Any protecting groups, e.g., ester groups, are removed by known methods to obtain the desired 3-(nucleophile-methyl)-$\Delta^3$-cephalosporanic acid derivatives. The bromine in the 3-bromomethyl-$\Delta^2$-cephalosporanate esters of Webber and Van Heyningen may be replaced with any oxygen, carbon, sulfur, or nitrogen containing nucleophilic group. Subsequent oxidation and reduction reactions cause no problems when the resulting 3-(nucleophile-methyl)-$\Delta^2$-cephalosporin ester is one having an oxygen or carbon bonded to the 3-methyl carbon atom. However, when the nucleophile is one having a nitrogen or sulfur bonded to the 3-methyl carbon atom, side reactions sometimes occur in the nucleophile group during the oxidation step in attempts to convert the sulfur in the 1-position to the sulfoxide state, thus lowering the yield of the desired 3-(nucleophile-methyl)-$\Delta^3$-cephalosporin ester-1-oxide. There is a need in the cephalosporin chemical art for a process for preparing 3-halomethyl-$\Delta^3$-cephalosporin esters so that the halogen can be replaced with an appropriate nucleophilic group in the process for making any desired known or new $\Delta^3$-cephalosporin antibiotic.

It is an object of this invention to provide an alternative process for preparing 3-halomethyl-$\Delta^3$-cephalosporin esters which are especially useful as intermediates in production of new and known nitrogen and sulfur containing 3-(nucleophile-methyl)-$\Delta^3$-cephalosporin antibiotics.

It is a further object of this invention to provide a process for preparing 3-halomethyl-$\Delta^3$-cephalosporins which have antibiotic activity and which can be used to form 3-(nucleophile-methyl)-$\Delta^3$-cephalosporins, which do not need to be subjected to oxidation and reduction conditions.

It is another object of this invention to provide a process which circumvents or avoids the problems that can result in some cases following the conversion of a 3-bromomethyl-$\Delta^2$-cephalosporin ester to a 3-(nucleophile-methyl)-$\Delta^2$-cephalosporin ester where the nucleophile has an oxidizable nitrogen or sulfur atom therein.

Other objects, advantages, and aspects of this invention will become apparent to those skilled in the art from the description which follows.

SUMMARY

Briefly, we have discovered that 3-halomethyl-$\Delta^3$-cephalosporin esters can be prepared by reacting a phosphorus chloride or bromide with a 3-hydroxymethyl-$\Delta^3$-cephalosporin sulfoxide ester in the presence of a tertiary amine in a substantially anhydrous aprotic organic liquid diluent at a temperature of from just above the freezing point of the reaction mixture to about 50°C. When a phosphorus trihalide is used at moderate temperatures, the product is a 3-halomethyl-$\Delta^3$-cephalosporin ester in which the sulfur in the 1-position is in the sulfide or bivalent state. This means that no separate reduction step is needed when phosphorus trichloride or phosphorus tribromide is used. When temperatures below about $-25°C$ are used with equimolar ratios of phosphorus trihalide, the 3-bromomethyl-$\Delta^3$-cephem sulfoxide product can be obtained. When a phosphorus pentahalide or a phosphorus oxyhalide is used, the product of the resulting reaction is a 3-halomethyl-$\Delta^3$-cephalosporin sulfoxide ester, which can be used as such as an intermediate for replacing the halogen with an appropriate nucleophilic group. These products are especially useful as intermediates for halogen displacement by basic nucleophiles, which basic pH condition might otherwise cause the $\Delta^3$-double bond to isomerize to the $\Delta^2$-position. The sulfoxide protects or keeps the $\Delta^3$-double bond in the 3-position.

This invention also includes a process for converting the 3-chloromethyl and 3-bromomethyl-$\Delta^3$-cephalosporin ester products to the corresponding new 3-iodomethyl-$\Delta^3$-cephalosporin compounds by reacting the 3-chloromethyl- or 3-bromomethyl-$\Delta^3$-cephalosporin ester product of the first step with an alkali metal iodide in an appropriate anhydrous organic liquid solvent system.

DETAILED DESCRIPTION OF THE INVENTION

The phosphorus halide used in the first step of the process can be any trivalent or pentavalent phosphorus compound having at least one halogen atom bonded directly to the phosphorus atom. The halogen can be chlorine or bromine. Preferred phosphorus halides are phosphorus trichloride, phosphorus tribromide, phosphorus pentachloride, phosphorus pentabromide, phosphorus oxychloride ($O=PCl_3$), and phosphorus oxybromide ($O=PBr_3$). When phosphorus pentabromide is used, temperatures in the lower part of the range must be used. Phosphorus halide compounds having organic radicals satisfying one or two valences of phosphorus, with at least one remaining phosphorus valence being satisfied by chlorine or bromine can be used. Such compounds should have a molecular weight below about 500. Examples of such compounds which could be used include methylphosphonous dichloride, phenylphosphonous dibromide, dimethoxyphosphinous chloride, diphenoxyphosphinous bromide, and the like. Those skilled in the art can readily determine the other types of phosphorus halides from these examples.

When the 3-iodomethyl-$\Delta^3$-cephalosporin compounds are being prepared, an iodide ion source is mixed with the 3-chloromethyl- or 3-bromomethyl-$\Delta^3$- cephalosporin ester in an organic solvent. The iodide ion is preferably added as an alkali metal iodide salt, e.g., the sodium, potassium, lithium, rubidium or cesium salt, but as a practical, economic matter, only the sodium and potassium salts are of interest. Alkaline earth metals including magnesium, iodide salts, and other reactive metal iodide salts can also be used but are not preferred.

The 3-hydroxymethyl-$\Delta^3$-cephalosporin sulfoxide ester starting material can be prepared by treating a corresponding 3-halomethyl-$\Delta^2$-cephalosporin ester with a mixture of an organic solvent and water in an organic aprotic diluent such as benzene to form the 3-hydroxymethyl-$\Delta^2$-cephalosporin ester, and then oxidizing the 3-hydroxymethyl-$\Delta_2$cephalosporin sulfoxide by known methods which results in the formation of the desired 3-hydroxymethyl-$\Delta^3$-cephalosporin sulfoxide ester. The organic solvent can be dimethylsulfoxide, diethylsulfoxide, or the like. The dialkylsulfoxide/water mixture should contain at least about 25 percent by volume of the dialkylsulfoxide. However, the water content of the mixture should be at least equivalent to the halide content of the 3-halomethyl-$\Delta^2$-cephalosporin ester. For example, p-methoxybenzyl 3-hydroxymethyl-7-phenoxyacetamido-$\Delta^3$-cephem-4-carboxylate-1-oxide can be prepared by reacting p-methoxybenzyl 3-bromomethyl-7-phenoxyacetamido-$\Delta^2$-cephem-4-carboxylate with 10 molar equivalents of water (relative to the 3-bromomethyl compound) in a 1:1 v/v mixture of benzene and dimethyl-sulfoxide followed by treatment with 85 percent m-chloroperbenzoic acid in a mixture of isopropyl alcohol and methylene chloride. The 2,2,2-trichloroethyl 3-hydroxymethyl-$\Delta^3$-cephem-4-carboxylate esters can be prepared by oxidizing with a peracid such as m-chloroperbenzoic acid the 2,2,2-trichloroethyl 3-hydroxymethyl-$\Delta^2$-cephem-4-carboxylate compounds disclosed, e.g., in South African Pat. No. 66/5105 (Derwent No. 26121, issued Apr. 25, 1967) in an organic solvent system such as methylene chloride /20% v/v isopropanol.

The phosphorus halide and the 3-hydroxymethyl-$\Delta^3$-cephalosporin sulfoxide ester reactants are combined in a substantially anhydrous aprotic liquid organic solvent such as benzene, toluene, xylene, heptane, hexane, methylene dichloride, chloroform, carbon tetrachloride, dioxane, tetrahydrofuran, lower alkyl alkanoates such as ethyl acetate, amyl acetate, lower alkanonitriles such as acetonitrile, proprionitrile, nitroalkanes such as nitromethane, nitropropane. A tertiary amine preferably is added to moderate the effect of hydrogen halide and to neutralize the by-product hydrogen halide. When temperatures below about $-25°C$ are used, substantially any tertiary amine can be used. However, when only moderately low temperatures are used ($-25°C$ to $+15°C$), the selected tertiary amine preferably has a pKa with the range of about 4.5 to about 5.8. Examples of preferred tertiary amines are N,N-dimethylaniline, pyridine, quinoline, and the like. The mixture is preferably maintained at relatively low temperatures, e.g., $-75°C$ to $+50°C$ to control the speed of the reaction which ensues spontaneously in most cases. The 3-halomethyl-$\Delta^3$-cephalosporin esters are formed from at least an equimolar amount of phosphorus trihalide when reaction temperatures above about $-25°C$ are used. The 3-halomethyl-$\Delta^3$-cephalosporin sulfoxide esters are formed from an approximately equimolar amount of a trivalent phosphorus trihalide when temperatures below about $-25°C$ are used.

The 3-halomethyl-$\Delta^3$-cephalosporin sulfoxide esters are formed from the phosphorus pentahalide or phosphorus oxyhalide reactants. Some warming up to 50°C may be required when the organic phosphoric halides are used. Stoichiometric equivalents of the reactants may be used, particularly when sulfoxide products are desired, but it is preferred to use at least a slight excess of the phosphorus halide relative to the 3-hydroxymethyl-$\Delta^3$-cephalosporin sulfoxide ester to insure complete reaction thereof. From 1 to 10 moles of the phosphorus halide may be used per mole of the sulfoxide ester reactant, particularly when trivalent phosporus trihalides are used to form the reduced cephalosporin ester products. Generally from 30 percent to 100 percent excess of phosphorus halide will be sufficient to insure substantially complete reaction.

When the reaction is completed, the 3-halomethyl-$\Delta^3$-cephalosporin ester product may be separated from the reaction mixture by conventional methods. For example, the mixture may be washed with aqueous sodium chloride, sodium bicarbonate, hydrochloric acid solutions and then with water to separate soluble impurities. The organic layer containing the product may then be separated and evaporated to substantial dryness to give the substantially pure 3-halomethyl-$\Delta^3$-cephalosporin ester product.

New compounds, obtained according to the process of this invention, have a formula

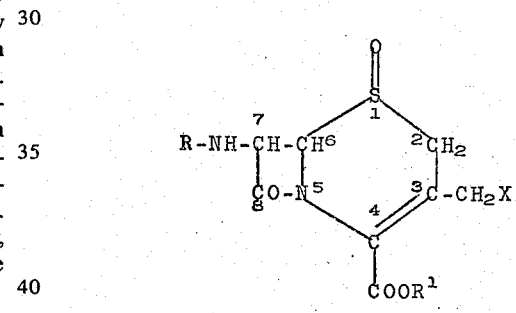

wherein R is an amino-protecting group, and $R^1$ is a carboxyl-protecting ester group, and X is chlorine, bromine, or iodine.

The amino-protecting group represented by R in the above can be any group known to protect the nitrogen to which it is bonded from attach by the phosphorus compounds. Examples of amino-protecting groups which can be used include trimethylsilyl, triphenylmethyl, butoxycarbonyl, or as is most practical and preferred, an acyl group. Many acyl groups suitable for use in the R position are already known in the penicillin and cephalosporin antibiotic literature. When it is desired to start the overall process from a penicillin, the preferred acyl groups for use in the R position can be generally described by the formula

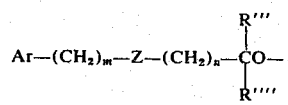

where Ar denotes 2-thienyl, or

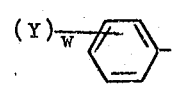

wherein m is an integer of from 0 to 4, n is an integer of from 1 to 4, Z is oxygen or sulfur, or a chemical bond, R''' and R'''' are, separately, hydrogen or methyl, or R''' is hydrogen when R'''' can be an N-protected amino group such as N-(tert-butoxycarbonyl)amino, N-(benzyloxycarbonyl)amino, N-(allyloxycarbonyl)-amino, N-(cyclopentyloxycarbonyl)amino, N-(2-methoxycarbonyl-1-methylvinyl)amino (the enamine from methylacetoacetate), or the like and n is 1; and Y is hydrogen or a substituent on the phenyl ring carbon atoms such as fluorine, chlorine, bromine, iodine, $C_1$ to $C_2$-alkyl, $C_1$ to $C_2$-alkyloxy, N-protected-alpha-amino-$C_1$ to $C_3$-alkyl, butoxycarbonyl, nitro, cyano, trifluoromethyl or the like, and w is an integer of from 1 to 2 and is preferably 1. Specific examples of some such acyl groups include phenylacetyl
phenoxyacetyl
phenylmercaptoacetyl
benzyloxyacetyl
benzylmercaptopropionyl
phenylpropionyl
phenylethylmercaptopropionyl
phenylbutoxybutyryl
3-fluorophenoxyacetyl
4-bromophenylacetyl
2-chlorobenbyloxypropionyl
3-methylphenylbutyryl
4-propylbenzylmercaptoacetyl
4-nitrophenylmercaptoacetyl
4-aminomethylphenylacetyl
3-cyanophenylpropionyl
4-trifluorophenoxyacetyl
2-thienylacetyl,
2[N-(tert-butoxycarbonyl)amino]-2-phenylacetyl or the like.

Numerous other compounds which form amino-protecting acyl groups which can be used in the R position are known in the prior art; e.g., those disclosed in the Behrens et al. U.S. Pat. Nos. 2,479,295 to 2,479,297 and 2,562,407 to 2,562,411 and 2,623,876.

If 7-aminocephalosporanic acid (7-ACA) is to be used as the starting material, the preferred 7-amino-protecting group will be one which is not only easy to put on the 7-amino nitrogen, but one which can be removed easily after the desired series of reactions on the 3-position methyl group are completed. In such event, the preferred 7-amino-protecting group can be a simple $C_1$ to $C_6$-alkanoyl group such as formyl, acetyl, propionyl, butanoyl, hexanoyl, a $C_2$ to $C_6$-chloroalkanoyl, particularly the α-chloroalkanoyl groups, such as 2-chloroacetyl which groups are put on by reacting 7-ACA with the respective acid chloride. If the selected overall process route to the cephalosporin antibiotic calls for acylating 7-ACA, an ester of 7-ACA, 7-ACA sulfoxide, or a 7-ACA sulfoxide ester with the final acyl group; one can acylate with, for example, an activated form of N-protected phenylglycine. Such activated form might be the mixed anhydride formed by reacting isobutyl chloroformate and 2-[N-(tert-butoxycarbonyl)amino]-2-phenylacetic acid.

The $R^1$ symbol in the above structural formula represents an ester group, preferably one that is easily removable by the use of trifluoroacetic or formic acids or a non-oxidizing mineral acid such as a hydrochloric acid, sulfuric acid, or by the use of zinc in an alkanoic acid such as formic acid, acetic acid, trifluoroacetic acid, or a mixture containing such acids, or by hydrogenation in the presence of a suitable hydrogenation catalyst such as palladium or rhodium on carbon, barium sulfate, alumina or other suitable carrier, or by the suspension of a palladium or rhodium compound in the hydrogenation reaction mixture. Preferred ester groups are 2,2,2-trichloroethyl, $C_4$ to $C_6$-tert-alkyl, $C_5$ to $C_7$-tert-alkenyl, $C_5$ to $C_7$-tert-alkynyl such as tert-butyl, tertpentyl, 1,1-dimethyl-2-propenyl, 1,1-dimethyl-2-butynyl, and 1,1-dimethyl-2-pentynyl, benzyl, methoxybenzyl, nitrobenzyl, phenacyl, trimethylsilyl, benzhydryl, phthalimidomethyl, and succinimidomethyl.

The 3-halomethyl-Δ³-cephalosporin ester products are useful as intermediates in the direct preparation of antibiotic cephalosporin compounds by removing the ester group therefrom by a variety of known methods. The 3-halomethyl-Δ³-cephalosporin sulfoxide ester products may be reduced to cephalosporin ester compounds and then de-esterified by known methods to prepare the free 3-halomethyl-Δ³-cephalosporin acid derivatives which are antibiotically active. Alternatively, in some cases, the sulfoxide ester can be de-esterified first and then reduced.

Examples of reduction methods which may be used include the treatment of (a) the 3-halomethyl-Δ³-cephalosporin sulfoxide acid or ester with (b) a reducing agent selected from the group consisting of:

1. hydrogen in the presence of a hydrogenation catalyst
2. stannous, ferrous, cuprous, or manganeous cations
3. Dithionite, iodide, or ferrocyanide anions
4. Trivalent phosphorus compounds having a molecular weight below about 500
5. halosilane compounds of the formula

wherein X is chlorine, bromine, or iodine, and each of R' and $R^2$ is hydrogen, chlorine, bromine, iodine, or a hydrocarbon radical free from aliphatic unsaturation and having from 1 to 8 carbon atoms, and 6. a halomethylene iminium halide of the formula

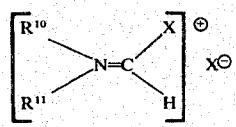

where X is chlorine or bromine, and wherein each of $R^{10}$ and $R^{11}$, taken separately, denotes a $C_1$ to $C_3$-alkyl or, taken together with the nitrogen to which they are bonded, complete a monocyclic, heterocylic ring having from 5 to 6 ring-forming atoms and a total of from 4 to 8 carbon atoms, and an activating agent which is (c) an acyl halide of an acid of carbon, sulfur, or phosphorus, which acid halide is inert to reduction by the reducing agent, and which acid halide has a second order hydrolysis constant equal to or greater than that of benzoyl chloride, or (d) a cyclic sultone of the formula

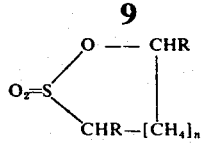

where n is 0 or 1, and each R is defined separately as hydrogen or $C_1$ to $C_3$-alkyl with not more than one such R being $C_1$ to $C_3$-alkyl, in a substantially anhydrous liquid medium at a temperature of from about $-20°$ C. to about $100°$ C. to form the 3-halomethyl-$\Delta^3$-cephalosporin acid or ester.

The compounds of both formulas I and II are primarily of interest in the preparation of known and new antibiotically active cephalosporin compounds, which is accomplished by replacing the chlorine, bromine, or iodine atom on the 3-halomethyl carbon atom with the desired nucleophilic group. For example, p-nitrobenzyl 3-chloromethyl-7-phenoxyacetamido-$\Delta^3$-cephem-4-carboxylate can be treated with sodium or potassium acetate in an organic medium to form p-nitrobenzyl 3-acetoxymethyl-7-phenoxyacetamido$\Delta^3$-cephem-4-carboxylate, and then the ester group can be removed by hydrogenation by known methods to obtain a known cephalosporin antibiotic, 3-acetoxymethyl-7-phenoxyacetamido-$\Delta^3$-cephem-4-carboxylic acid. If more active antibiotics are desired, the 7-acylamido group can be cleaved by known methods, e.g., as described in U.S. Pat. No. 3,188,311, issued June 8, 1965, and then the resulting cephem nucleus can be acylated with 2'-thiophene-2-acetic acid, acid chloride, or mixed anhydride to form the corresponding 3-halomethyl-7-(2'-thienylacetamido)-$\Delta^3$-cephalosporin ester which can then be de-esterified to the acid antibiotic, or treated with a nucleophilic reagent to displace the chlorine or bromine and then be de-esterified to form the more active antibiotic. By this procedure, cephalothin, a known antibiotic, available commercially as the sodium cephalothin salt, can be obtained from the products and by the process of this invention. Also, the 3-halomethyl-$\Delta^3$-cephalosporin ester product of this invention can be treated with a sulfur-containing nucleophile such as methyl mercaptan to form the 3-methylthiomethyl-$\Delta^3$-cephalosporin ester. This 3-methylthiomethyl-$\Delta^3$-cephalosporin ester can be treated as described above to remove the 7-acyl group or other amino-protecting group and replacing it with a desired acyl group such as an N-blocked, D-phenylglycine by known acylation procedures. The N-blocking group and the ester group can then be removed to form 3-methylthiomethyl-7-D-$\alpha$-phenyl-$\alpha$-aminoacetamido-$\Delta^3$-cephem-4-carboxylic acid as the zwitterion, hydrate, or salt with a pharmaceutically acceptable cation such as sodium or potassium, or anion such as the hydrochloride, nitrate, sulfate, phosphate, or the like. These 3-methylthiomethyl-$\Delta^3$-cephalosporin compounds are effective as antibiotics, administered either parenterally or orally. For this purpose, these compounds can be administered, e.g., orally in doses of from about 250 mg. to about 500 mg., in pulvules or tablets, 4 to 6 times a day to patients of about 70 kg. body weight.

Specific cephalosporin starting materials, intermediates and products of the process of this invention are named, for convenience, by use of the "cephem" nomenclature system. "Penam" nomenclature for the penicillins is described by Sheehan, Henery-Logan, and Johnson in the Journal of the American Chemical Society (JACS), 75, 3292, footnote 2, (1953), and has been adapted to the cephelosporins by Morin, Jackson, Flynn, and Roeske. [JACS, 84, 3400, (1962)]. In accordance with these systems of nomenclature, "phenam" and "cepham" refer respectively to the following saturated ring systems:

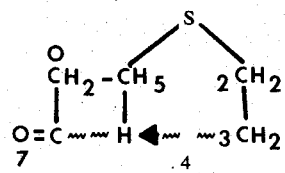   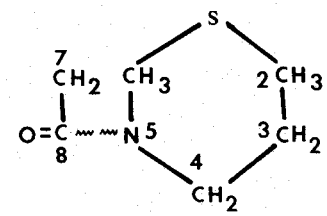

Penam                    Cepham

Cephem refers to the cepham ring structure containing a double bond, the position of which is indicated by a prefixed $\Delta$ with a superscript number denoting the lowest numbered carbon atom to which the double bond is connected, or by the word "delta" with the same number relationship. Sometimes, the number is used before cephem without the symbol $\Delta$ or the word delta to indicate the same double bond position. Thus, penicillin V, 6-phenoxymethylpenicillin, can be named 6-(phenoxyacetamido)-2,2-dimethyl-penam-3-carboxylic acid, and 7-phenoxyacetamido-cephalosporanic acid can be named as 3-acetoxymethyl-7-phenoxyacetamido-$\Delta^3$-cephem-4-carboxylic acid. An example of a 3-halomethyl-$\Delta^3$-cephalosporin ester of this invention, by this nomenclature system, can be named tert-butyl 3-chloromethyl-7-phenoxymethylacetamido-$\Delta^3$-cephem-4-carboxylate, obtained from tert-butyl 3-hydroxymethyl-7-phenoxyacetamido-$\Delta^3$-cephem-4-carboxylate-1-oxide and phosphorus trichloride.

We have also found that 3-hydroxymethyl-$\Delta^2$-cephalosporin esters will also react with phosphorus trihalidos such as phosphorus tribromide or trichloride to form the corresponding 3-bromomethyl or 3-chloromethyl-$\Delta^2$-cephalosporin derivative. For example, tert-butyl 7-phenoxyacetamido-3-hydroxymethyl-$\Delta^2$-cephem-4-carboxylate can be reacted with phosphorus tribromide to form tert-butyl 7-phenoxyacetamido-3-bromomethyl-$\Delta^2$-cephem-4-carboxylate. However, that process is of no particular value to the process route we currently contemplate for an overall method of obtaining 7-acylamido-3-nucleophile-methyl-$\Delta^3$-cephem-4-carboxylic acid cephalosporin antibiotics.

The invention is further exemplified by the following detailed examples, which are not intended to limit the scope of starting materials or products but merely to indicate the operation of the process and typical preparations of new compounds.

EXAMPLE 1

Preparation of t-butyl 7-(phenoxyacetamide)-3-bromomethyl-$\Delta^3$-cephem-4-carboxylate To a stirred, cooled (−10° C.) solution of 0.440 g. (1 mmole) of 4-t-butyl 7-(phenoxyacetamido)-3-hydroxymethyl-$\Delta^3$-cephem-4-carboxylate-1-oxide and 0.4 ml. of N,N-dimethylaniline in 15 ml. of methylene chloride was added 0.2 ml. (2 mmoles) of phosphorus tribromide in 10 ml. of methylene chloride dropwise over a 10 minute period. The reaction was stirred an additional 20 minutes at −10° upon completing the addition. The reaction mixture was poured into a separatory funnel and washed successively with 10 percent sodium chloride in water, 5 percent sodium bicarbonate in water, 3 percent hydrochloric acid solution, and water. The organic solution was evaporated to dryness to give 0.33 g. of the tert-butyl 3-bromomethyl-7-phenoxyacetamido-$\Delta^3$-cephem-4-carboxylate. A thin layer chromatogram showed pure product and the structure was confirmed by nuclear magnetic resonance (NMR) spectrum.

EXAMPLE 2

Preparation of t-butyl 7-(phenoxyacetamido)-3-chloromethyl-$\Delta^3$-cephem-4-carbocylate-1-oxide.

A solution of 0.110 g. (0.25 mmoles) of the tert-butyl 3-hydroxymethyl-7-phenoxyacetamido-$\Delta^3$-cephem-4-carboxylate-1-oxide and 1 drop of pyridine in 10 ml. of anhydrous tetrahydrofuran was treated with 0.060 g. of phosphorus pentachloride. The reaction mixture was stirred at 25° for 30 minutes. The reaction mixture was then poured into ice water and extracted with methylene chloride. The methylene chloride solution was washed with 5 percent sodium bicarbonate in water, dried over sodium sulfate and evaporated to dryness. The mixture (0.106 g.) was separated by preparative thin layer chromatography to give 0.035 g. of product. An NMR spectrum verified the structure of the tert-butyl 3-chloromethyl-7-phenoxyacetamido-$\Delta^3$-cephem-4-carboxylate-1-oxide.

EXAMPLE 3

Preparation of 7-phenoxyacetamido-3-acetoxymethyl-$\Delta^3$-cephem-4-carboxylic acid.

A solution of 0.290 g. of t-butyl 7-(phenoxyacetamido)-3-bromomethyl-$\Delta^3$-cephem-4-carboxylate in 10 ml. of acetone was stirred for 24 hours with 0.250 g. of tetramethylammonium acetate. A thin layer chromatogram revealed the presence of two compounds. The solvent was evaporated to dryness and the residue was washed with ethyl acetate. The ethyl acetate solution was washed with 3 percent hydrochloric acid and 5 percent sodium bicarbonate, dried over sodium sulfate, and evaporated to dryness to give 0.19 g. product. The product was dissolved in 5 ml. of formic acid and stirred at 25° for 1 hour. The acidic solution was poured into water and extracted with ethyl acetate. The ethyl acetate solution was washed with 5 percent aqueous sodium bicarbonate and the basic solution was acidified. Extraction of the new acid solution with ethyl acetate and evaporation of the ethyl acetate gave 0.072 g. of acidic material. A thin layer chromatogram and a bioautograph of a paper chromatogram of the acidic material showed it to be 3-acetoxymethyl-7-phenoxyacetamido-$\Delta^3$-cephem-4-carboxylic acid, a known antibiotic.

EXAMPLE 4 p-Methoxybenzyl 3-chloromethyl-7-phenoxyacetamido-$\Delta^3$-cephem-4-carboxylate To a solution of 150 mg. of p-methoxybenzyl 3-hydroxymethyl-7-phenoxyacetamido-$\Delta^3$-cephem-4-carboxylate-1-oxide was added 12 drops of dry pyridine and then 12 drops phosphorus trichloride. After stirring 2 hours at room temperature, the reaction mixture was evaporated to dryness, diluted with ethyl acetate, and washed with cold 5 percent HCl, bicarbonate solution, 2 times with sodium chloride solution, dried over MgSO$_4$, filtered and evaporated to give 140 mg. of an orange oil.

This oil was applied to two commercial preparative thin layer chromatographic plates (2 mm.) and eluted with a 1:1 benzeneethyl acetate mixture. There was obtained 56 mg. of the p-methoxybenzyl 3-chloromethyl-7-phenoxyacetamido-$\Delta^3$-cephem-4-carboxylate, which structure was confirmed by nuclear magnetic resonance (NMR) spectroscopy.

The following additional exemplary compounds are prepared according to the process of this invention by the procedures of the above examples.

1,1-Dimethyl-2-propenyl 3-chloromethyl-7-(p-nitrophenylacetamido)-$\Delta^3$-cephem-4-carboxylate from phosphorus trichloride and 1,1-dimethyl-2-propenyl 3-hydroxymethyl-7-(p-nitrophenylacetamido)-$\Delta^3$-cephem-4-carboxylate-1-oxide.

Phthalimidomethyl 3-bromomethyl-7-phenylmercaptomethyl-$\Delta^3$-cephem-4-carboxylate from phosphorus tribromide and phthalimidomethyl 3-hydroxymethyl-7-phenylmercaptomethyl-$\Delta^3$-cephem-4-carboxylate-1-oxide, 1,1-Dimethyl-2-propynyl 3-chloromethyl-7-(3'-chlorophenylacetamido)-$\Delta^3$-cephem-4-carboxylate-1-oxide from phosphorus pentachloride and 1,1-dimethyl-2-propynyl 3-hydroxymethyl-7-(3'-chlorophenylacetamido)-$\Delta^3$-cephem-4-carboxylate-1-oxide.

EXAMPLE 5 tert-Butyl 7-phenoxyacetamido-3-iodomethyl-$\Delta^3$-cephem-4-carboxylate

A solution of 0.380 g. of crude tert-butyl 7-phenoxyacetamido-3-bromomethyl-$\Delta^3$-cephem-4-carboxylate-1-oxide, prepared as described in Example 1, was dissolved in 10 ml. of acetone and stirred at 25° C. for 1 hour with 0.5 g. of potassium iodide. The resulting reaction mixture was centrifuged and the supernatant was evaporated in vacuo to give 0.40 g. of crude product, tert-butyl 7-phenoxyacetamido-3-iodomethyl-$\Delta^3$-cephem-4-carboxylate. The NMR spectrum of this product was similar to, but not superimposable on, the spectrum of the 3-bromomethyl derivative starting material which indicated the complete conversion to the 3-iodomethyl derivative.

EXAMPLE 6

To a solution of 2-methyl-3-butynyl 7-phenoxyacetamido-3-hydroxymethyl-$\Delta^3$-cephem-4-carboxylate-1-oxide in 40 ml. of methylene chloride containing 0.4 ml. of N,N-dimethylaniline, cooled at −10° C., there was added dropwise 0.4 ml. of phosphorus tribromide in 30 ml. of methylene chloride over a 45 minute period. When the addition was completed, the reaction mixture was stirred for an additional 30 minutes at −10° C. to insure complete reaction. The solvent was removed under vacuum and the residue was dissolved in an ethyl acetate/water mixture. The organic solution was separated from the aqueous phase and subsequently washed with 10 percent sodium chloride aqueous solution, 3 percent hydrochloric acid solution, and then with a 5 percent sodium bicarbonate aqueous solution. The washed organic solution was dried over sodium sulfate and evaporated to dryness to give 0.78 g. of the 2-methyl-3-butynyl 7-phenoxyacetamido-3-bromomethyl-$\Delta^3$-cephem-4-carboxylate as product. A thin layer chromatogram showed the presence of one component whose rf was different from that of the starting material.

The following additional compounds are prepared by procedures described above:

p-Methoxybenzyl 3-bromomethyl-7-(p-tolylacetamido)-$\Delta^3$-cephem-4-carboxylate-1-oxide from phosphorus pentabromide and p-methoxybenzyl 3-hydroxymethyl-7-(p-tolylacetamido)-$\Delta^3$-cephem-4-carboxylate-1-oxide;

p-Nitrobenzyl 3-bromomethyl-7-(4'-trifluoromethylphenoxyacetamido)-$\Delta^3$-cephem-4-carboxylate-1-oxide from phosphorus oxybromide and p-nitrobenzyl 3-hydroxymethyl-7-(4'-trifluoromethylphenoxyacetamido)-$\Delta^3$-cephem-4-carboxylate-1-oxide;

1,1-Dimethyl-2-pentynyl 3-chloromethyl-7-(3'-methoxyphenylacetamido)-$\Delta^3$-cephem-4-carboxylate-1-oxide from phosphorus oxychloride and 1,1-dimethyl-2-pentynyl 3-hydroxymethyl-7-(3'-methoxyphenylacetamido)-$\Delta^3$-cephem-4-carboxylate-1-oxide;

Succinimidomethyl 3-chloromethyl-7-(4'-cyanophenylacetamido)-$\Delta^3$-cephem-4-carboxylate from phenylphosphonous dichloride and succinimidomethyl 3-hydroxymethyl-7-(4'-cyanophenylacetamido)-$\Delta^3$-cephem-4-carboxylate-1-oxide;

tert-Butyl 3-bromomethyl-7-[(4'-aminomethyl)-phenylacetamido]-$\Delta^3$-cephem-4-carboxylate-1-oxide from phosphorus oxybromide and tert-butyl 3-hydroxymethyl-7-[4'-(aminomethyl)-phenylacetamido]-$\Delta^3$-cephem-4-carboxylate-1-oxide;

2,2,2-trichloroethyl 3-chloromethyl-7-(3',4'-dichlorophenoxyacetamido)-$\Delta^3$-cephem-4-carboxylate from phosphorus trichloride and 2,2,2-trichloro 3-hydroxymethyl-7-(3',4'-dichlorophenoxyacetamido-$\Delta^3$-cephem-4-carboxylate-1-oxide, and Benzhydryl 3-bromomethyl-7-phenylacetamido-$\Delta^3$-cephem-4-carboxylate-1-oxide from phosphorus pentabromide and benzhydryl 3-hydroxymethyl-7-phenylacetamido-$\Delta^3$-cephem-4-carboxylate-1-oxide.

Also, according to this invention we have found that the 3-halomethyl-7-acylamido-3-cephem-4-carboxylate sulfoxide esters can be made by reacting approximately equivalent amounts of the phosphorus tribromide or phosphorus trichloride with the 3-hydroxymethyl-7-acylamido-3-cephem-4-carboxylate-1-oxide esters at relatively low temperatures, below −25°. By this means the halogenation can be accomplished, and the 3-halomethyl-3-cephem ester product can be retained in its more stable sulfoxide state for use of the compound as an intermediate in subsequent chemical operations to prepare desired cephalosporin antibiotic compounds as indicated above. Such method is illustrated by the following example.

EXAMPLE 7

Preparation of tert-butyl 7-(phenoxyacetamido)-3-bromomethyl-3-cephem-4-carboxylate-1-oxide.

To a stirred solution of 0.208 g (0.5 millimole) of tert-butyl 7-phenoxy-acetamido-3-hydroxymethyl-3-cephem-4-carboxylate-1-oxide in 40 ml. of methylene chloride at −35°C containing 0.060 g (0.50 millimole) of N,N-dimethyl-aniline, was added dropwise a solution of 10 ml. of methylene chloride containing 0.135 g (0.50 millimole) of phosphorus tribromide. After the addition was completed the reaction mixture was stirred at −35°C for 1 hour. Then the solvents were evaporated in vacuo and the residue was suspended in ethyl acetate. The ethyl acetate solution was washed three times with 50 ml. portions of 3 percent hydrochloric acid solution, once with saturated sodium bicarbonate solution, once with water, and then dried over sodium sulfate and evaporated to dryness to give 0.160 g. of crude tert-butyl 3-bromomethyl-7-phenoxyacetamido-3-cephem-4-carboxylate-1-oxide as product. The crude product mixture was separated on two 20 cm. by 0.2 cm. silica gel preparative thin layer chromatography plates. The compound of intermediate polarity was isolated as 0.065 g of white foam. A nuclear magnetic resonance spectrum proved the identity of the compound to be tert-butyl 3-bromomethyl-7-phenoxyacetamido-3-cephem-4-carboxylate-1-oxide.

EXAMPLE 8

7-Acetamido-3-acetoxymethyl-$\Delta^3$-cephem-4-carboxylic acid is prepared by reacting 7-aminocephalosporanic acid (7-ACA) with acetyl chloride. The 7-acetamido-3-acetoxymethyl-$\Delta^3$-cephem-4-carboxylic acid is treated with oxalyl chloride in the presence of a small amount of N,N-dimethylformamide to form the corresponding acid chloride. This acid chloride of 7-acetamido-3-acetoxymethyl-$\Delta^3$-cephem-4-carboxylic acid is dissolved in methylene chloride and the solution is treated with tert-butanol and triethylamine to form the tert-butyl 7-acetamido-3-acetoxymethyl-$\Delta^2$-cephem-4-carboxylate ester.

The tert-butyl 7-acetamido-3-acetoxymethyl-$\Delta^2$-cephem-4-carboxylate is oxidized with a peracid such as meta-chloroperbenzoic acid in isopropanol/methylene chloride mixture to form the tert-butyl 7-acetamido-3-acetoxymethyl-$\Delta^3$-cephem-4-carboxylate-1-oxide.

The tert-butyl 7-acetamido-3-acetoxymethyl-$\Delta^3$-cephem-4-carboxylate-1-oxide is treated with citrus acetylesterase by known procedures to obtain the tert-butyl 7-acetamido-3-hydroxymethyl-$\Delta^3$-cephem-4-carboxylate-1-oxide.

The tert-butyl 7-acetamido-3-hydroxymethyl-$\Delta^3$-cephem-4-carboxylate-1-oxide is treated with phosphorus tribromide, following the procedure described in Example 7 to obtain as product the tert-butyl 7-acetamido-3-bromomethyl-$\Delta^3$-cephem-4-carboxylate-1-oxide.

This product can be used as an intermediate to prepare a wide variety of known and new cephalosporin antibiotics. For example, this product can be treated with methanol to form the 3-methoxymethyl analog, or with methyl mercaptan to form the 3-methylthiomethyl analog. Such compounds can then be reduced to the sulfide state, treated by the known $PCl_5/CH_3OH/H_2O$ procedures to cleave the 7-acetyl group, re-acylated with any acryl group known to contribute to good activity in the resulting $\Delta^3$-cephalosporin acid. For example, the tert-butyl 7-amino-3-methylthiomethyl-$\Delta^3$-cephem-4-carboxylate ester "nucleus" compound can be acylated with an alkyl mixed anhydride of an N-D-(tert-butoxycarbonylamido)phenylglycine, and then the tert-butoxycarbonyl protecting group and the tert-butyl esters are removed by known methods to form the 3-methylthiomethyl-7-[D-2'-amino-2'-phenylacetamido]-$\Delta^3$-cephem-4-carboxylic acid zwitterion (inner salt), a known antibiotic.

EXAMPLE 9

The amino group of 7-aminocephalosporanic acid (7-ACA) is protected with a formyl group by reacting 7-ACA with the mixed anhydride formed by adding formic acid to acetic acid anhydride to form the 7-formamido-3-acetoxymethyl-$\Delta^3$-cephem-4-carboxylic acid. This N-protected 7-ACA is esterified in the manner described in Example 8 to form the tert-butyl 7-formamido-3-acetoxymethyl -$\Delta^2$-cephem-4-carboxylate ester. This $\Delta^2$-cephalosporin ester is oxidized as described in Example 8 to form the tert-butyl 7-formamido-3-acetoxymethyl-$\Delta^3$-cephem-4-carboxylate-1-oxide. This $\Delta^3$-cephalosporin sulfoxide ester is hyrolyzed with citrus acetyl esterase to form the tert-butyl 7-formamido-3-hydroxymethyl-$\Delta^3$-cephem-4-carboxylate-1-oxide, which is the starting material for the process of this invention.

Following the procedure of example 7, phosphorus tribromide is reacted with tert-butyl 7-formamido-3-hydroxymethyl-$\Delta^3$-cephem-4-carboxylate-1-oxide to form tert-butyl 7-formamido-3-bromomethyl-$\Delta^3$-cephem-4-carboxylate of this invention.

This compound is useful as an intermediate in the production of known and new cephalosporin antibiotics. For example, this compound can be treated with methanol to form the tert-butyl 7-formamido-3-methoxymethyl-$\Delta^3$-cephem-4-carboxylate-1-oxide, the sulfoxide ester can be reduced with potassium iodide/acetyl chloride to form the tert-butyl 7-formamido-3-bromomethyl-$\Delta^3$-cephem-4-carboxylate, the formyl group can be cleaved with mineral acid at $-15°$ to $100°C$ to form the 7-amino-3-methoxymethyl-$\Delta^3$-cephem-4-carboxylate ester "nucleus." This nucleus ester can be acylated with any acyl group known to contribute to the formation of a cephalosporin compound having significant antibiotic activity. For example, the nucleus ester can be acylated with an activated, N-protected form of D-phenylglycine to form the tert-butyl 7-[D-2-(N-protected amino)-2'-phenylacetamido]-3-methoxymethyl-$\Delta^3$-cephem-4-carboxylate ester. The N-protecting group and the ester group can be removed by known procedures to form the 7-[D-2'-amino-2'-phenylacetamido]-3-methoxymethyl-$\Delta^3$-cephem-4-carboxylic acid, and a known antibiotic.

We claim:
1. A compound having the formula

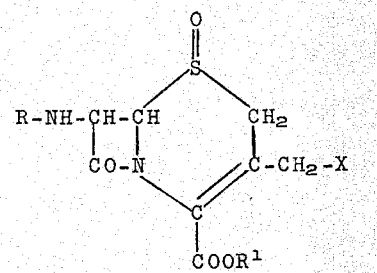

wherein X is chlorine, bromine or iodine; R is $C_1$ to $C_6$-alkanoyl, $C_2$ to $C_6$-chloroalkanoyl, or an acyl group of the formula

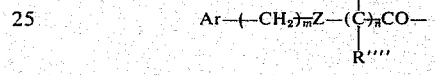

where Ar is 2-thienyl or

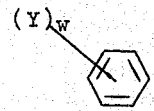

wherein $m$ is an integer of from 0 to 4, $n$ is an integer of from 1 to 4, Z is oxygen or sulfur or a chemical bond, R''' and R'''' are, separately, hydrogen or methyl, or when R''' is hydrogen, R'''' can be an N-protected amino selected from the group consisting of N-tert-butoxycarbonyl)amino, N-(benzyloxycarbonyl)-amino, N-(allyloxycarbonyl)amino, N-(cyclopentyloxycarbonyl)-amino, and N-(2-methoxycarbonyl-1-methylvinyl)amino and $n$ is 1; and Y is hydrogen or a substituent on the phenyl ring carbon atoms such as fluorine, chlorine, bromine, iodine, $C_1$ to $C_2$-alkyl, $C_1$ to $C_2$-alkyloxy, N-protected-alpha-amino-$C_1$ to $C_3$-alkyl, butoxycarbonyl, nitro, cyano, trifluoromethyl and $w$ is an integer of from 1 to 2; and R' is 2,2,2-trichloroethyl, $C_4$ to $C_6$-tert-alkyl, $C_5$ to $C_7$-tert-alkenyl, $C_5$ to $C_7$-tert-alkynyl, benzyl, methoxybenzyl, nitrobenzyl, phenacyl, phthalimidomethyl, or succinimidomethyl.

2. A compound having the formula

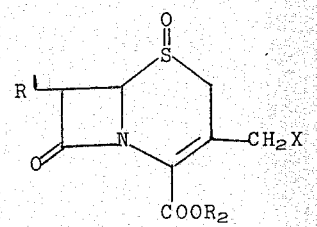

wherein R' is phenoxyacetamido or phenylacetamido; $R_2$ is t-butyl or 2,2,2-trichloroethyl and X is selected from the group consisting of chlorine, bromine or iodine.

3. A compound as defined in claim 1 wherein X is chlorine, R is phenoxyacetyl, and $R^1$ is $C_4$ to $C_6$-tert-alkyl.

4. A compound as defined in claim 1 wherein X is chlorine, R is phenoxyacetyl, and $R^1$ is methoxybenzyl.

5. A compound as defined in claim 1 wherein X is bromine, R is phenoxyacetyl, and $R^1$ is $C_4$ to $C_6$-tert-alkyl.

6. A compound as defined in claim 5 wherein the compound is tert-butyl 3-bromomethyl-7-phenoxyacetamido-3-cephem-4-carboxylate-1-oxide.

* * * * *

UNITED STATES PATENT AND TRADEMARK OFFICE
CERTIFICATE OF CORRECTION

PATENT NO. : 3,922,268
DATED : November 25, 1975
INVENTOR(S) : Charles F. Murphy
J. Alan Webber It is certified that error appears in the above-identified patent and that said Letters Patent are hereby corrected as shown below:

Column 3, line 2, "Jan. 1971;" should read --Jan. 25, 1971;--.

Column 6, line 2, "are formed from the phosphorus pentahalide or phos-" should read --are formed from an approximately equimolar amount of a trivalent phosphorous trihalide when temperatures below about -25°C. are used. The 3-halomethyl-$\Delta^3$-cephalosporin sulfoxide esters are formed from the phosphorus pentahalide or phos- --.

UNITED STATES PATENT AND TRADEMARK OFFICE
CERTIFICATE OF CORRECTION

PATENT NO. : 3,922,268

DATED : November 25, 1975

INVENTOR(S) : Charles F. Murphy
J. Alan Webber

It is certified that error appears in the above-identified patent and that said Letters Patent are hereby corrected as shown below:

Column 10, following line 16 the structures should read:

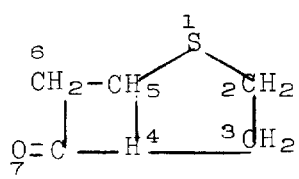 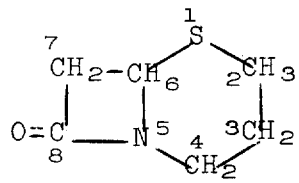

Penam                           Cepham

Column 13, line 66, "mide or or phosphorus" should read --mide or phosphorus--.

UNITED STATES PATENT OFFICE

CERTIFICATE OF CORRECTION

Patent No. 3,922,268  Dated November 25, 1975

Inventor(s) Charles F. Murphy et al.

It is certified that error appears in the above-identified patent and that said Letters Patent are hereby corrected as shown below:

Column 15, line 9, "acryl" should read -- acyl --.

Signed and Sealed this twenty-sixth Day of July 1977

[SEAL]

Attest:

RUTH C. MASON  
Attesting Officer

C. MARSHALL DANN  
Commissioner of Patents and Trademarks